United States Patent
Lv et al.

(10) Patent No.: US 12,293,443 B2
(45) Date of Patent: May 6, 2025

(54) METHOD AND APPARATUS FOR SPATIAL LOCATING

(71) Applicant: MATRIXED REALITY TECHNOLOGY CO., LTD., Wuxi (CN)

(72) Inventors: Xianwei Lv, Beijing (CN); Zhenxing You, Beijing (CN); Rui Han, Beijing (CN)

(73) Assignee: MATRIXED REALITY TECHNOLOGY CO., LTD., Wuxi (CN)

( * ) Notice: Subject to any disclaimer, the term of this patent is extended or adjusted under 35 U.S.C. 154(b) by 183 days.

(21) Appl. No.: 18/003,342

(22) PCT Filed: Jul. 26, 2021

(86) PCT No.: PCT/CN2021/108394
§ 371 (c)(1),
(2) Date: Dec. 27, 2022

(87) PCT Pub. No.: WO2022/022449
PCT Pub. Date: Feb. 3, 2022

(65) Prior Publication Data
US 2023/0316608 A1    Oct. 5, 2023

(30) Foreign Application Priority Data

Jul. 27, 2020  (CN) .......................... 202010729794.0

(51) Int. Cl.
*G06T 11/60* (2006.01)
*G06F 1/16* (2006.01)
(Continued)

(52) U.S. Cl.
CPC ................ *G06T 11/60* (2013.01); *G06T 7/73* (2017.01); *G06T 7/90* (2017.01); *G06T 11/001* (2013.01);
(Continued)

(58) Field of Classification Search
CPC ......... G06T 11/60; G06T 11/001; G06T 7/55; G06T 7/73; G06T 7/90;
(Continued)

(56) References Cited

U.S. PATENT DOCUMENTS 10,043,076 B1    8/2018  Zhang et al.
10,719,953 B1 *  7/2020  Ye ............................ G06T 7/246
(Continued)

FOREIGN PATENT DOCUMENTS

CN    109658445 A    4/2019
CN    110349213 A    10/2019
(Continued)

OTHER PUBLICATIONS

The extended European search report received in the corresponding European application 21850314.2, mailed Nov. 3, 2023.
(Continued)

*Primary Examiner* — Wesner Sajous (57) ABSTRACT

A method and apparatus for spatial locating. The method includes: acquiring feature area information and a current image captured by a camera (102); searching the current image for a feature area of an interactive device based on the feature area information, to determine position information, the position information being used to indicate the position of the feature area in the current image (104); determining first pose information associated with the position and attitude of the feature area relative to the camera (106) based on the position information; calculating a re-projection error of the feature area in the current image (108) based on the
(Continued)

feature area information and the first pose information; and if the re-projection error is less than or equal to a preset threshold, determining current pose information associated with the position and attitude of the interactive device currently in a global coordinate system (110) based on the first pose information.

20 Claims, 6 Drawing Sheets (51) Int. Cl.
*G06F 18/22* (2023.01)
*G06T 7/73* (2017.01)
*G06T 7/90* (2017.01)
*G06T 11/00* (2006.01)
*G06V 10/40* (2022.01)
*G06V 20/10* (2022.01)

(52) U.S. Cl.
CPC .... *G06F 1/163* (2013.01); *G06T 2207/10024* (2013.01)

(58) Field of Classification Search
CPC . G06T 2207/10024; G06T 2207/10021; G06T 2207/10028; G06T 2207/30244; G06F 18/22; G06F 1/163; G06V 10/40; G06V 20/10; G06V 20/20; G06V 10/147; G06V 10/75; G01C 21/365
See application file for complete search history.

(56) References Cited

U.S. PATENT DOCUMENTS

| | | | |
|---|---|---|---|
| 10,957,068 B2* | 3/2021 | Tomioka | G06V 10/40 |
| 11,037,325 B2* | 6/2021 | Tomioka | G06V 10/75 |
| 2016/0232715 A1* | 8/2016 | Lee | G06F 3/011 |
| 2017/0185081 A1* | 6/2017 | Steele | G09B 9/08 |
| 2018/0150686 A1* | 5/2018 | Vandonkelaar | G06F 3/0346 |
| 2018/0211399 A1 | 7/2018 | Lee et al. | |

FOREIGN PATENT DOCUMENTS

| | | |
|---|---|---|
| CN | 111833403 A | 10/2020 |
| WO | 2010141378 A1 | 12/2010 |
| WO | 2020001168 A1 | 1/2020 |

OTHER PUBLICATIONS

Buchan Austin D et al: "Low-cost monocular localization with active markers for micro autonomous underwater vehicles", 2017 IEEE/RSJ International Conference on Intelligent Robots and Systems (IROS), IEEE, Sep. 24, 2017 (Sep. 24, 2017), pp. 4181-4188, XP033266430, DOI: 10.1109/IROS.2017.8206279 [retrieved on Dec. 13, 2017].
International Search Report received in the corresponding International Application PCT/CN2021/108394, mailed Oct. 26, 2021.

* cited by examiner

METHOD AND APPARATUS FOR SPATIAL LOCATING

CROSS REFERENCE TO RELATED APPLICATIONS

The present application is a national phase entry under 35 USC § 371 of International Application PCT/CN2021/108394, filed on Jul. 26, 2021, which claims the benefit of and priority to Chinese Patent Application No. 202010729794.0, filed on Jul. 27, 2020, the entire disclosures of which are incorporated herein by reference.

TECHNICAL FIELD

Embodiments of the description relate to the field of information technology, and specifically relate to a method, an electronic device, an apparatus, and a machine-readable storage medium for spatial locating.

BACKGROUND

With rapid development of various technologies such as computers and communications, augmented reality (AR) and other technologies have also developed rapidly. The AR technology generally refers to technology that enhances a user's perception of a reality scene by using information provided by computer technology. Specifically, with the AR technology, computer technology can be used to apply virtual information to the real world, that is, to overlay a real scene and a virtual image (e.g., a virtual object, a virtual scene, etc.) in the same screen in real time, such that human eyes see a mixed image of the real scene and the virtual image simultaneously, thereby achieving an augmented reality effect.

Usually, a user can interact with a virtual object in an AR scene by means of an interactive device to produce an expected effect. For example, the user can move the interactive device, and the physical movement of the interactive device can be transformed into movement of the virtual object in the AR scene, thereby achieving the purpose of controlling the virtual object. Hence, in this case, how to determine the position of the interactive device in the space has become one of problems to be solved.

SUMMARY

An embodiment of the description provides a method for spatial locating, including: acquiring feature area information and a current image captured by a camera; searching the current image for a feature area of an interactive device based on the feature area information, to determine position information, the position information being used to indicate the position of the feature area in the current image; determining first pose information associated with the position and attitude of the feature area relative to the camera based on the position information; calculating a re-projection error of the feature area in the current image based on the feature area information and the first pose information; and if the re-projection error is less than or equal to a preset threshold, determining current pose information associated with the position and attitude of the interactive device currently in a global coordinate system based on the first pose information.

BRIEF DESCRIPTION OF THE DRAWINGS

The above and other objectives, features and advantages of embodiments of the description will become more apparent from more detailed description of the embodiments of the description in conjunction with the accompanying drawings. In the embodiments of the description, same reference signs generally represent same elements.

DETAILED DESCRIPTION

Subjects described herein will now be discussed with reference to embodiments. It should be understood that these embodiments are discussed just to enable those skilled in the art to better understand and implement the subjects described herein, and are not intended to limit the scope of protection, applicability or examples set forth in the claims. Functions and arrangements of elements discussed can be changed without departing from the scope of protection of the claims. In the embodiments, various processes or components can be omitted, substituted or added, as needed.

As used herein, the term "includes" and its variants denote open-ended terms, meaning "including but not limited to". The term "based on" means "at least partially based on". The terms "one embodiment" and "an embodiment" denote "at least one embodiment". The term "another embodiment" denotes "at least one other embodiment". The terms "first", "second" and the like may refer to different or same objects. Other definitions can be included below, whether explicitly or implicitly, and the definition of a term is consistent throughout the description unless explicitly indicated in the context.

Usually, a user can experience an AR scene by means of an AR device. The AR device may usually be a head-mounted device, such as glasses, a helmet or the like. The user can interact with a virtual object in the AR scene by means of an interactive device to produce an expected effect. For example, the user can move the interactive device, and the physical movement of the interactive device can be transformed into movement of the virtual object in the AR scene, thereby achieving the purpose of controlling the virtual object.

As is known, an object has six degrees of freedom (DoF) in space, i.e., degrees of freedom of movements along directions of three rectangular coordinate axes of x, y and z and degrees of freedom of rotations around the three coordinate axes. Although the object can also be located by three degrees of freedom, the position and attitude of the object can be determined more accurately based on the six degrees of freedom. Therefore, in order to be able to more precisely control a virtual object in an AR scene to achieve good interaction between a user and an AR device, it is expected that a 6DoF function can be implemented for an interactive device.

In view of this, embodiments of the description provide technical solutions for spatial locating, which can efficiently implement a 6DoF function for an interactive device.

Herein, the interactive device can be understood as a hand-held controller of an AR device.

In an embodiment, the interactive device can be any of various smart electronic devices with computing, control and other functions in the art, such as smart phones, tablet devices, smart wearable devices, other electronic devices with computing functions, and so on. In this case, the smart electronic device as the interactive device can implement some or all of the computing functions, and is electrically connected to a display component, and the smart electronic device performs computation and transmits a rendering result to the display component; and the smart electronic device can implement the functions as the interactive device.

In another embodiment, the interactive device can be a device without a computing function, such as a simple hand-held controller without a computing function, or the like. In this case, the AR device performs the computing functions independently, and the interactive device only implements the function of interacting with the AR device. The AR device can be a split device, which generally includes a display part and a computing part that are connected electrically. The display part generally has no computing function or relatively few computing functions, and the computing part can be a smart electronic device with computing functions. The smart electronic device can perform related computing and processing functions. For example, it performs a rendering function, and then can send a rendering result to the display part to present the rendering result. The smart electronic device can include a smart phone, a tablet device, a laptop computer, a desktop computer, or the like. The AR device can also be an all-in-one device, i.e., the AR device can have computing and processing functions, perform a rendering function, and then present a rendering result.

Technical solution of the description will be described below in conjunction with specific embodiments.

Figure 1:
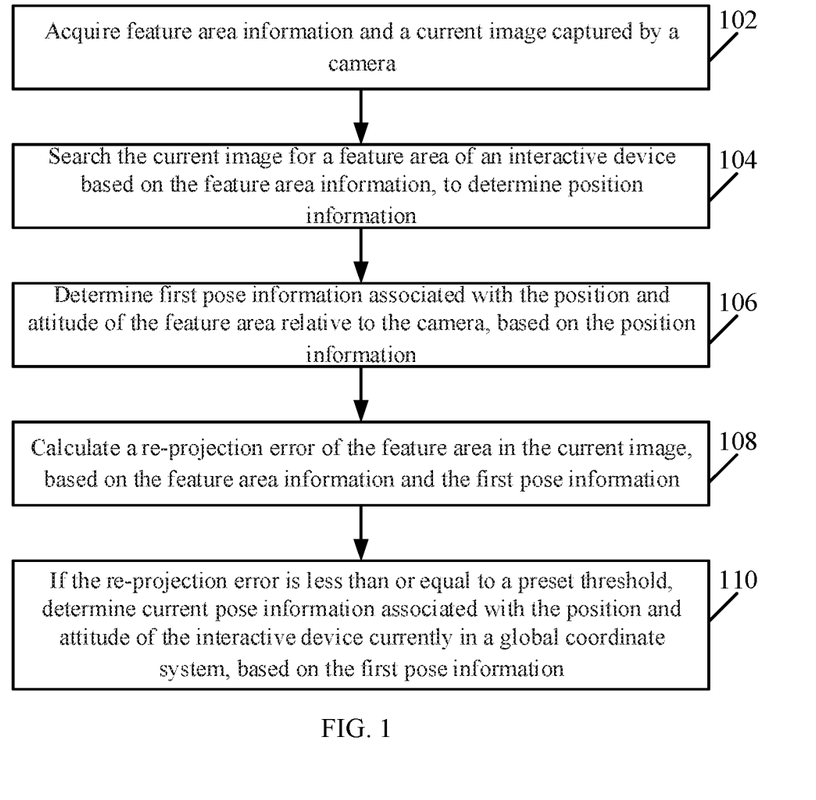
FIG. 1 is a schematic flow diagram of a method for spatial locating according to an embodiment.

FIG. 1 is a schematic flow diagram of a method for spatial locating according to an embodiment.

For example, in the case where the interactive device is a smart electronic device, the method of FIG. 1 can be performed by the interactive device. In the case where the interactive device is a device without a computing function, the method of FIG. 1 can be performed by an all-in-one device with computing functions or by a computing part of a split device.

As shown in FIG. 1, in step 102, feature area information and a current image captured by a camera can be acquired.

The acquired feature area information can be pre-stored, and the feature area information is information related to a feature area of the interactive device. For example, the feature area of the interactive device is a picture, and the feature area information includes pixels in the picture and their corresponding position information.

For example, the camera can be mounted on an AR device; or not mounted on an AR device, but mounted for example on any other suitable position capable of providing a relatively large field of view. The camera can perform photography with a relatively large field of view, for a relatively large area, such as an environmental area where the interactive device is located. Usually, in the case where the interactive device is equipped with a camera, the camera mentioned in step 102 can have a larger field of view than the camera of the interactive device.

In step 104, based on the feature area information, the current image can be searched for a feature area of an interactive device to determine position information. The position information can be used to indicate the position of the feature area in the current image.

In step 106, based on the position information, first pose information associated with the position and attitude of the feature area relative to the camera can be determined.

In step 108, based on the feature area information and the first pose information, a re-projection error of the feature area in the current image can be calculated.

In step 110, if the re-projection error is less than or equal to a preset threshold, then based on the first pose information, current pose information associated with the position and attitude of the interactive device currently in a global coordinate system can be determined.

In some cases, the interactive device can be a smart electronic device with a camera. Thus, in some implementations, it is possible to use the camera of interactive device itself to determine the position of the interactive device in space. While it is also possible to achieve a 6DoF function by using an image captured by the camera of the interactive device, there are a number of drawbacks. For example, continuous operation of the camera of the interactive device may greatly increase power consumption of the interactive device. In addition, in the case of a large scene with a far distance, the position and attitude obtained based on the image captured by the camera of the interactive device may have a drift, resulting in a poor effect on 6DoF implementation and a poor user experience.

Herein, the image captured by the camera is used to locate the feature area of the interactive device, and thereby the position and attitude of the interactive device currently in the global coordinate system can be determined, thus enabling efficient implementation of the 6DoF function for the interactive device. In addition, compared with the prior art in which only the camera of the interactive device itself is used to locate the interactive device, with embodiments herein, power consumption of the interactive device can be reduced and it does not even need to equip the interactive device with a camera, thereby reducing the cost of the interactive device.

In an embodiment, the feature area of the interactive device can be two-dimensional or located on the same plane.

In an embodiment, the feature area of the interactive device can include various areas on the interactive device where feature point detection can be performed.

For example, the feature area of the interactive device can include a target picture located on the interactive device. As another example, the feature area of the interactive device can include a physical structure on the interactive device where feature point detection can be performed. Feature area information related to the target picture and the physical structure can be pre-stored. For example, feature area information related to the physical structure where feature point detection can be performed includes the shape of the physical structure and its corresponding position information.

In this way, based on the position, in the current image, of the area on the interactive device where feature point detection can be performed, the position and attitude of the interactive device in the global coordinate system can be determined efficiently and accurately.

Herein, the target picture can be arranged on the interactive device in various forms.

For example, the target picture can be a non-electronic picture, such as a paper picture. In this case, the paper picture can be attached to interactive devices in an appropriate attachment manner (e.g., pasting).

As another example, the interactive device can include a display screen. In this case, the target picture can be an electronic picture, and can be displayed on the display screen. In some cases, in order to better detect the target picture in the current image, the target picture can occupy more than a certain proportion of the display screen, such as 50%. The proportion can be set according to actual needs, application scenarios, etc.

Herein, in the case where the target picture is an electronic picture, the target picture can be generated in some appropriate ways so as to be more beneficial for image detection.

In an embodiment, the method includes: in response to detecting that the current image includes at least two identical feature areas, changing the target picture displayed on the display screen. If it is detected that the current image includes at least two identical feature areas, at least two interactive devices may be detected, and in this case, it is difficult to distinguish which interactive device is the interactive device that is continuously tracked. By changing the target picture displayed on the interactive device to distinguish it from target pictures displayed on other interactive devices, the 6DOF pose of the interactive device can continue to be tracked. The target picture displayed on the interactive device after the change is different from the target picture displayed before the change. For example, the target picture before the change has different feature area information from feature area information of the target picture after the change. Alternatively, the target picture before the change and the target picture after the change have the same feature area information, but the target picture before the change and the target picture after the change also include non-feature area information, and the non-feature area information of the target picture before the change is different from that of the target picture after the change.

In an embodiment, environment image information related to the environment surrounding the interactive device can be acquired by means of/by using the camera mentioned in step 102. The environment image information can include an RGB value of a pixel.

A first color can be determined based on the environment image information. The first color can be a color that accounts for the lowest proportion in the environment image information. For example, a color histogram of the environment image information can be calculated, and then a color with the smallest color channel value in the color histogram, i.e., a color accounting for the lowest proportion in the environment image information, can be determined.

Then, the target picture can be generated based on the first color, and then the target picture is displayed on the display screen.

In this embodiment, since the first color is the color accounting for the lowest proportion in the environment image information, generating the target picture based on the first color is conducive to faster determination of a candidate position of the interactive device in the current image. Hence, this approach can speed up the image detection process and greatly reduce the amount of detection computation.

In addition, herein, there can be various implementations regarding generating the target picture based on the first color.

In an embodiment, a second color inverse to the first color can be determined by color inversion. For example, the second color can be obtained by subtracting an RBG value of the first color from the value 255. Of course, the second color can also be obtained by any of other various applicable color inversion methods. This is not limited herein.

Figure 2A:
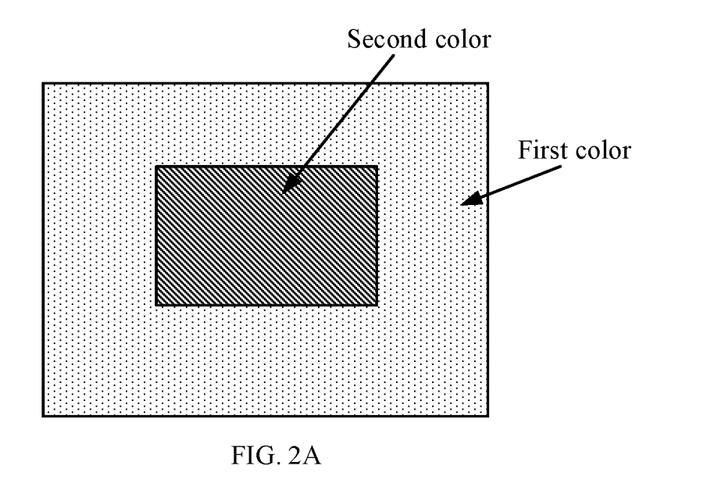
FIGS. 2A to 2C are schematic diagrams of examples of target pictures according to embodiments.

Then, the target picture can be generated based on the first color and the second color. For example, the target picture can include the first color and the second color, and in the target picture, the color of an edge portion of the target picture can be the first color and the color of a center portion of the target picture can be the second color. For example, FIG. 2A shows an example of the target picture. For ease of description, in the example of FIG. 2A, the target picture is represented as a rectangle. It should be understood, however, that in specific implementations, the target picture may have various other shapes, such as a circle, a polygon, etc., and this is not limited herein.

In this embodiment, using the color accounting for the lowest proportion in the environment image information as the color adjacent to the environment can speed up the image detection process and reduce the amount of detection computation. The target picture includes the first color and the second color as the inverse color of the first color so as to maximize the contrast of the target picture, which is conducive to rapid locating of feature points in the current image.

Figure 2B:
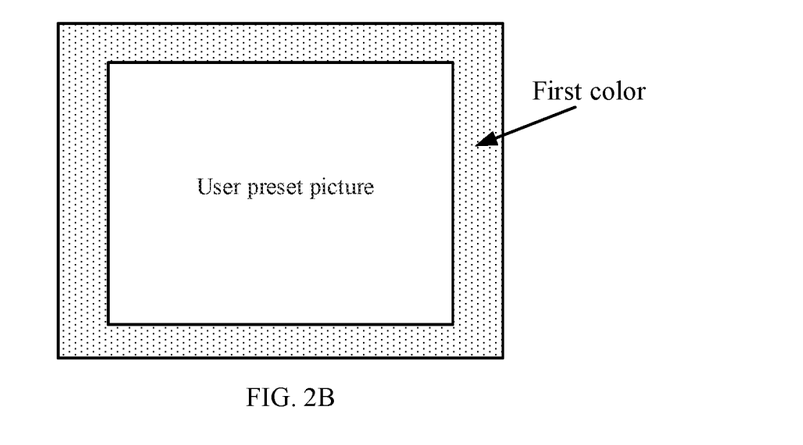

In another embodiment, a user preset picture can be determined, and then the target picture can be generated based on the user preset picture and the first color. Specifically, a border having the first color can be added to the user preset picture to form the target picture. For example, FIG. 2B shows an example of the target picture. For ease of description, in the example of FIG. 2B, the border is represented as a rectangular border. In specific implementations, the border may have various other shapes, such as a circle, a rounded rectangle, a polygon, etc., and this is not limited herein.

In this embodiment, by adding the border to the user preset picture, which border has the color accounting for the lowest proportion in the environment image information, feature point locating for the border in the current image is facilitated. Furthermore, a user can flexibly set the user preset picture according to various factors such as an actual scene and preferences, so user experience can be enhanced.

Figure 2C:
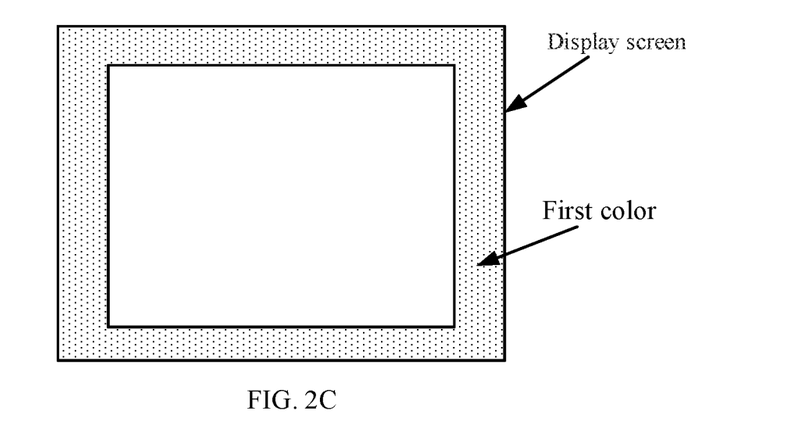

In another embodiment, a border graphic having the first color can be generated as the target picture. That is, the target picture is the border graphic having the first color. Accordingly, the border graphic can be displayed at a border of the display screen. For example, FIG. 2C shows an example. In the example of FIG. 2C, for ease of description, the border is represented as a rectangle. In specific implementations, the border can have various other shapes, and this is not limited in the description.

In this embodiment, the target picture can occupy the border of the display screen, which not only is conducive to feature point detection in the current image, but also can reduce occupation of display resources of the interactive device. For example, other portions of the display screen can be used to display other contents.

It should be understood that FIGS. 2A-2C are just intended to help those skilled in the art to better understand embodiments of the description, rather than limiting the scope of the described technical solutions.

The feature area is described above, and how to determine position information is further described below.

In an embodiment, in step 104, a global search can be performed on the current image to find the feature area of the interactive device, thereby obtaining position information.

For example, if the current image is a first frame of image, the position information of the feature area can be determined by the global search.

If the current image is not a first frame of image, the position information can also be determined by a local search. In this case, the position of the feature area can be estimated first. For example, the interactive device can be equipped with an inertial measurement unit (IMU). The estimated position of the feature area in the current image can be determined based on previous IMU data, acquired by means of the inertial measurement unit, related to an angular velocity and acceleration of the interactive device along three axes.

Then, a potential search area in the current image can be determined based on the estimated position. For example, the estimated position can be used as the center to obtain the potential search area.

Thereafter, the potential search area is searched for the feature area of the interactive device to obtain the position information.

Specifically, the IMU can usually include an accelerometer and a gyroscope. The accelerometer can measure acceleration of the interactive device along three axes, and the gyroscope can measure an angular velocity of the interactive device about three axes. Herein, the information can be collectively referred to as IMU data.

In addition, the interactive device usually moves smoothly rather than instantaneously, so based on the IMU data, the next position and attitude of the interactive device can be estimated. Using the estimated position and attitude, a possible position of the feature area of the interactive device in the next frame of image can be estimated. Based on the possible position, a potential search area in the next frame of image can be determined, such that the feature area can be quickly found by searching the potential search area.

Hence, in this way, the detection process of the feature area can be greatly accelerated, thereby reducing the amount of searching computation.

As shown in FIG. 1, after the position information is determined, first pose information can be determined in step 106. The first pose information can indicate the position and attitude, e.g., position, relative translation, rotation, etc., of the feature area relative to the camera. The first pose information can be determined by using an appropriate algorithm. For example, the first pose information can be determined by solving a PNP (Perspective-N-Point) problem and using an ICP (Iterative Closest Point) algorithm.

Thereafter, in step 108, a re-projection error of the feature area in the current image can be calculated, based on the first pose information.

If the re-projection error is less than or equal to a preset threshold, the first pose information is considered credible, and thus current pose information associated with the position and attitude of the interactive device currently in a global coordinate system can be determined, based on the first pose information. The above preset threshold can be set according to actual needs, experience, etc.

If the re-projection error is too large (e.g., greater than a preset threshold), it indicates that the first pose information may be inaccurate.

In one case, if the re-projection error is greater than the preset threshold, then based on the current image, the position of the feature area in the current image can be redetermined. Then, based on the redetermined position, subsequent steps are performed again, such as determining new first pose information, calculating a new re-projection error, etc.

In another embodiment, if the re-projection error is greater than the preset threshold, a new image captured by the above-mentioned camera can be acquired, and then the steps for the current image as described above can be performed again based on the new image.

For example, based on the feature area information, the new image can be searched for the feature area of the interactive device to determine new position information of the feature area in the new image. Then, based on the new position information, new first pose information associated with the position and attitude of the feature area relative to the camera can be determined. Based on the new first pose information, a new re-projection error of the feature area in the new image can be calculated. If the new re-projection error is less than or equal to the preset threshold, then based on the new first pose information, new pose information associated with the position and attitude of the interactive device in the global coordinate system can be determined.

If the new re-projection error is greater than the preset threshold, then based on the new image, the position of the feature area in the new image is redetermined, or another new image acquired by the camera is acquired to be re-searched for the feature area.

Thus, it can be understood that the process of FIG. 1 is a continuously cyclic process, so the position and attitude of the interactive device in the global coordinate system can be continuously obtained by continuously determining the position of the feature area in the captured image. In this way, by using the continuously obtained position and attitude of the interactive device, a virtual object associated therewith in an AR scene can be controlled smoothly.

Herein, there can also be various implementations regarding determining the current pose information.

In an embodiment, second pose information associated with the position and attitude of the camera in the global coordinate system can be obtained. The current pose information can be determined based on the first pose information and the second pose information.

Figure 3:
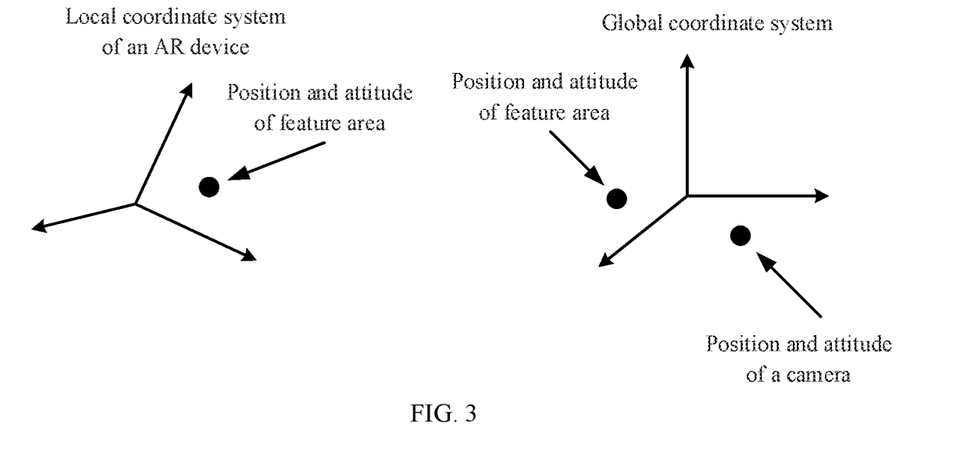
FIG. 3 is an example of coordinate system transformation according to an embodiment.

Specifically, the position and attitude of the feature area of the interactive device in the global coordinate system can be obtained, by coordinate system transformation, based on the position and attitude of the camera in the global coordinate system and the position and attitude of the feature area of the interactive device relative to the camera. The position and attitude of the feature area of the interactive device in the global coordinate system can be considered as the position and attitude of the interactive device in the global coordinate system. For ease of description, FIG. 3 shows an example of coordinate system transformation. It should be understood that FIG. 3 is just intended to help those skilled in the art to better understand embodiments herein, rather than limiting the scope of the described technical solutions.

In another embodiment, the interactive device can be equipped with an IMU. In this case, the current pose information can be obtained based on the first pose information, the second pose information and IMU data.

As described above, coordinate system transformation can be performed based on the first pose information and the second pose information to obtain a preliminary position and attitude of the feature area in the global coordinate system.

Since the interactive device usually moves smoothly rather than instantaneously, the next position and attitude of the interactive device can be estimated based on the IMU data, acquired by means of the inertial measurement unit, currently related to the angular velocity about three axes and the acceleration of the interactive device along three axes. Based on the obtained preliminary position and attitude of the feature area in the global coordinate system, a future position and attitude of the feature area of the interactive device can be estimated, and the estimated future position and attitude are used as the current pose information. In another embodiment, the preliminary position and attitude of the feature area in the global coordinate system obtained in the previous embodiment can be fused with the IMU data of the interactive device to obtain the position and attitude of the feature area currently in the global coordinate system, i.e., the position and attitude of the interactive device currently in the global coordinate system. Data fusion can be performed by various applicable algorithms, such as the an EKF (Extended Kalman Filter) algorithm. When the preliminary position and attitude of the feature area in the global coordinate system is fused with the IMU data of the interactive device, the weight of the preliminary position and attitude of the feature area in the global coordinate system can be set to be greater than that of the IMU data of the interactive device.

Due to a higher frequency of the IMU, the combination with the IMU data can obtain positions and attitudes of a higher frequency, thereby reducing data latency, so that a motion trajectory of the interactive device is smoother, and correspondingly a motion trajectory of the virtual object associated therewith is smoother, thus greatly improving the user experience. In addition, this approach is more robust and more stable, and therefore can better adapt to a fast movement scenario of the interactive device.

In an embodiment, one can be chosen from the two approaches of determining the current pose information based on actual needs. For example, the first or second approach can be chosen based on whether the interactive device is equipped with an IMU, or whether the user expects to use the IMU of the interactive device, etc.

For the first approach, the interactive device does not need to be equipped with an IMU, so the cost of the interactive device can be reduced. For the second approach, the IMU of the interactive device can be used, and the pose information of the interactive device is smoother.

To enable those skilled in the art to better understand the technical solutions of the description, description is made below in conjunction with a specific example, but the example does not limit the scope of the described technical solutions.

Figure 4:
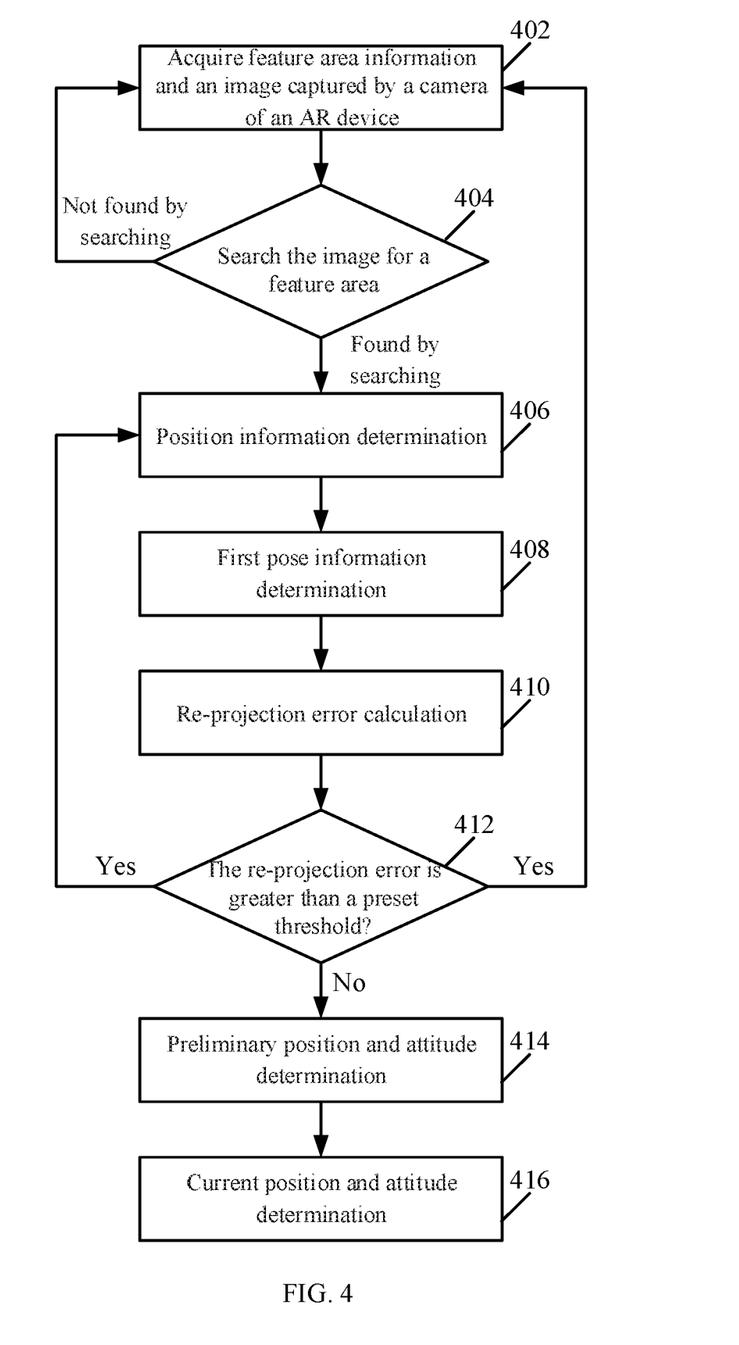
FIG. 4 is a schematic flow diagram of a process for spatial locating according to an embodiment.

FIG. 4 is a schematic flow diagram of a process for spatial locating according to an embodiment. In this embodiment, it can be assumed that the camera mentioned in step 102 of FIG. 1 is mounted on an all-in-one AR device, and the all-in-one AR device can perform the following steps; it can also be assumed that the camera mentioned in step 102 of FIG. 1 is mounted on a display part of a split AR device, and a computing part of the split AR device can perform the following steps. The computing part of the split AR device can be used as an interactive device, and a hand-held controller separated from the AR device can also be used as an interactive device.

As shown in FIG. 4, in step 402, feature area information and an image captured by a camera of an AR device can be acquired.

In step 404, based on the feature area information, the received image can be searched for a feature area of the interactive device.

As described above, an estimated position of the feature area in the image can be determined based on IMU data of the interactive device. Based on the estimated position, a potential search area in the image can be determined, and then the potential search area can be searched for the feature area. If the feature area is not found by searching the potential search area, a global search can also be performed on the image.

If the feature area is not found by searching the image, it indicates that the feature area may be not captured by the camera of the AR device, or the feature area is not in the field of view of the camera of the AR device. In this case, it can return to step 402 to acquire a new image captured by the camera.

If the feature area is found by searching the image, then in step 406, position information can be determined. The position information can indicate the position of the feature area in the image.

In step 408, based on the position information, first pose information associated with the position and attitude of the feature area relative to the camera can be determined.

In step 410, based on the feature area information and the first pose information, a re-projection error of the feature area in the image can be calculated.

In step 412, it can be determined whether the re-projection error is greater than a preset threshold.

In a case, if the re-projection error is greater than the preset threshold, it indicates that the position information may be inaccurate, and therefore, it can return to step 406 to redetermine the position of the feature area in the image.

In another case, if the re-projection error is greater than the preset threshold, it can return to step 402 to acquire a new image captured by the camera.

If the re-projection error is less than or equal to the preset threshold, then in step 414, a preliminary position and attitude of the feature area in a global coordinate system can be determined based on the first pose information and a second pose information. As described above, the second pose information can be associated with the position and attitude of the camera in the global coordinate system, e.g., the second pose information includes the position and attitude of the camera in the AR device and the position and attitude of the AR device in the global coordinate system.

In step 416, the IMU data of the interactive device can be fused with the preliminary position and attitude of the feature area in the global coordinate system to obtain the position and attitude of the feature area currently in the global coordinate system, as the position and attitude of the interactive device currently in the global coordinate system.

Hence, in this embodiment, since the camera of the AR device has a large field of view, thus based on the image, including the feature area of the interactive device, captured by the camera of the AR device and the IMU data of the interactive device, the position and attitude of the interactive device in the global coordinate system can be determined accurately, thereby controlling the motion of a virtual object associated therewith more accurately, thus improving the user experience. In addition, this approach can obtain positions and attitudes at a higher frequency, resulting in a smoother motion trajectory, and is more robust, and therefore can better adapt to a fast movement scenario of the interactive device.

Furthermore, compared with an approach that uses a camera and an IMU of an interactive device, the embodiment of the description can effectively reduce power consumption of the interactive device and achieve a lower cost of the interactive device.

In an embodiment, provided is a method for spatial locating for use in an interactive device. A display screen is provided on a surface of the interactive device, and a target picture is displayed on the display screen. The method includes: acquiring feature area information and a current image captured by a camera, the camera being provided in an electronic device different from the interactive device, the electronic device being communicatively connected to the interactive device to transmit the current image to the interactive device; searching the current image for a feature area of the interactive device based on the feature area information, to determine position information, wherein the position information is configured to indicate the position of the feature area in the current image, and the feature area includes the target picture displayed on the display screen; determining first pose information associated with the position and attitude of the feature area relative to the camera based on the position information; calculating a re-projection error of the feature area in the current image based on the feature area information and the first pose information; and if the re-projection error is less than or equal to a preset threshold, determining current pose information associated with the position and attitude of the interactive device currently in a global coordinate system based on the first pose information. As the camera is provided in the electronic device different from the interactive device, the current image containing the feature area of the interactive device can be captured conveniently. The electronic device can transmit the current image to the interactive device by means of a wired connection or a wireless connection. The current pose information associated with the position and attitude of the interactive device currently in the global coordinate system can be used to locate the interactive device. By continuously localizing the interactive device, the interactive device can be used to interact with virtual objects displayed in an augmented reality device, a virtual reality device, or a mixed reality device.

In an embodiment, the color of an edge portion of the target picture is different from the color of the surface on which the display screen is provided. The color of the edge portion of the target picture can be determined by color inversion, for example by subtracting, from the value 255, a RBG value of the color of the surface on which the display screen is provided.

In an embodiment, the target picture includes a border formed by the color of the edge portion and a user preset picture arranged in the border.

In an embodiment, provided is a method for spatial locating for use in an electronic device, the method including: acquiring feature area information and a current image captured by a camera, the camera being provided in the electronic device; searching the current image for a feature area of an interactive device based on the feature area information, to determine position information, wherein the position information is configured to indicate the position of the feature area in the current image, and the feature area includes a physical structure on a plane on the interactive device where feature point detection can be performed; determining first pose information associated with the position and attitude of the feature area relative to the camera based on the position information; and acquiring second pose information associated with the position and attitude of the camera in the global coordinate system, and determining current pose information associated with the position and attitude of the interactive device currently in a global coordinate system, by coordinate system transformation, based on the first pose information and the second pose information. As the interactive device and the electronic device are two devices respectively, the current image containing the feature area of the interactive device can be captured conveniently by using the camera of the electronic device.

In an embodiment, the interactive device is provided with an inertial measurement unit, and the method includes: fusing the current pose information associated with the position and attitude of the interactive device currently in the global coordinate system with IMU data, to obtain updated current pose information associated with the position and attitude of the interactive device currently in the global coordinate system, the IMU data being acquired by means of the inertial measurement unit, currently related to an angular velocity about three axes and an acceleration of the interactive device along three axes, wherein the weight of the current pose information is greater than that of the IMU data during an updating process.

Figure 5:
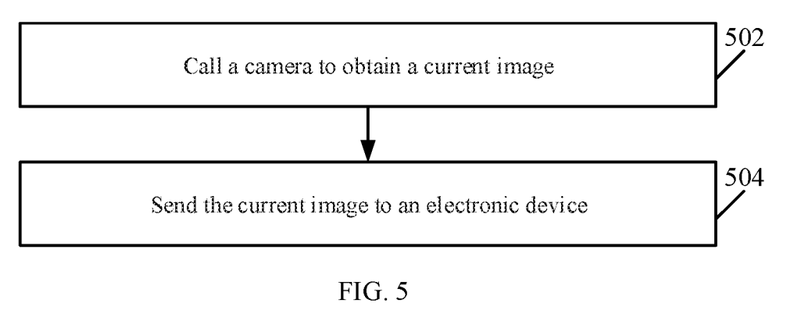
FIG. 5 is a schematic flow diagram of a method for spatial locating according to an embodiment.

FIG. 5 is a schematic flow diagram of a method for spatial locating according to an embodiment. In FIG. 5, embodiments similar to the preceding embodiments will not be described in order to avoid repetition.

As shown in FIG. 5, in step 502, a camera can be called to perform photography to obtain a current image, which includes a feature area of an interactive device. For example, the camera can be mounted on a display part of a split AR device, or mounted on an all-in-one AR device, or separately mounted at any position that can provide a relatively large field of view. Thus, the method of FIG. 5 can be performed by a device capable of controlling the camera. For example, the device can be a split AR device, or an all-in-one AR device, or a camera electrically connected to an AR device.

In step 504, the current image can be sent to an electronic device, so that the electronic device determines current pose information associated with the position and attitude of the interactive device currently in a global coordinate system, based on the current image.

For example, if the interactive device is a smart electronic device (e.g., a cell phone), the electronic device itself in step 504 can also act as the interactive device. Hence, in step 504, the current image can be sent to the interactive device.

If the interactive device is a device without a computing function, the electronic device in step 504 can be a device different from the interactive device. For example, the electronic device can, as a computing part of a split AR device, be connected to a display part of the split AR device and the interactive device. In an embodiment, the electronic device can be an all-in-one AR device.

Figure 6:
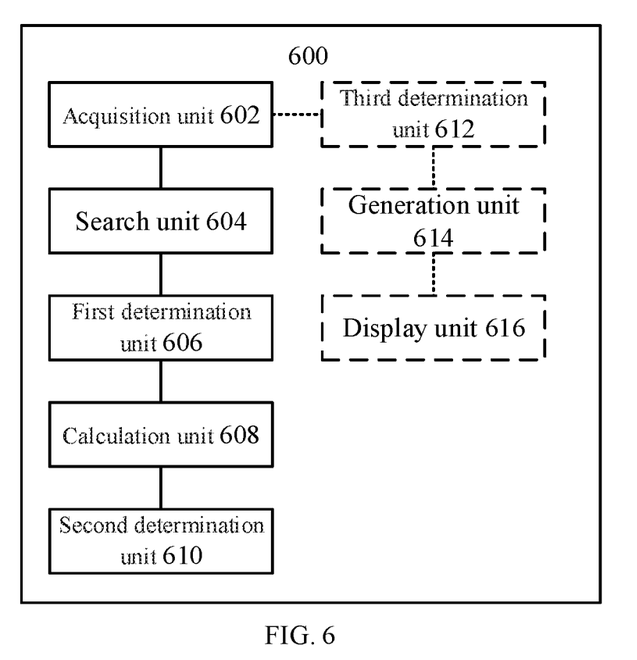
FIG. 6 is a schematic block diagram of an electronic device according to an embodiment.

FIG. 6 is a schematic block diagram of an electronic device according to an embodiment.

As shown in FIG. 6, the electronic device 600 can include an acquisition unit 602, a search unit 604, a first determination unit 606, a calculation unit 608, and a second determination unit 610.

The acquisition unit 602 can acquire feature area information and a current image captured by a camera.

The search unit 604 can determine position information, based on the feature area information and the current image. The position information can be configured to indicate the position of the feature area in the current image.

The first determination unit 606 can, based on the feature area information, search the current image for a feature area of an interactive device to determine the position information. The position information can be configured to indicate the position of the feature area in the current image.

The calculation unit 608 can calculate a re-projection error of the feature area in the current image, based on the feature area information and first pose information.

If the re-projection error is less than or equal to a preset threshold, the second determination unit 610 can determine current pose information associated with the position and attitude of the interactive device currently in the global coordinate system, based on the first pose information.

In an embodiment, the feature area can include a target picture located on the interactive device, or a physical structure on the interactive device where feature point detection can be performed.

In an embodiment, the interactive device can include a display screen. The electronic device 600 can also include a third determination unit 612, a generation unit 614, and a display unit 616.

The acquisition unit 602 can also acquire environment image information related to the environment surrounding the interactive device by means of/by using the camera.

The third determination unit 612 can determine a first color based on the environment image information. The first color can be a color accounting for the lowest proportion in the environment image information.

The generation unit 614 can generate the target picture based on the first color.

The display unit 616 can display the target picture on the display screen.

In an embodiment, the generation unit 614 can determine a second color inverse to the first color by color inversion. Then, the generation unit 614 can generate the target picture including the first color and the second color. In the target picture, the color of an edge portion of the target picture can be the first color and the color of a center portion of the target picture can be the second color.

In an embodiment, the generation unit 614 can determine a user preset picture. The generation unit 614 can obtain the target picture by adding a border having the first color to the user preset picture.

In an embodiment, the generation unit 614 can generate a border graphic having the first color, as the target picture. The display unit 616 displays the border graphic at a border of the display screen.

In an embodiment, the second determination unit 610 can acquire second pose information associated with the position and attitude of the camera in the global coordinate system. The second determination unit 610 can determine the current pose information, based on the first pose information and the second pose information.

In an embodiment, the second determination unit 610 can acquire the second pose information, and acquire, by means of an inertial measurement unit, IMU data related to an angular velocity about three axes and an acceleration of the interactive device along three axes. The second determination unit 610 can determine the current pose information, based on the first pose information, the second pose information, and the IMU data.

In an embodiment, the search unit 604 can estimate the position of the feature area in the current image, based on previous IMU data acquired by means of the inertial measurement unit, the IMU data is related to an angular velocity about three axes of the interactive device and an acceleration of the interactive device along three axes. The search unit 604 can determine a potential search area in the current image based on the estimated position. The search unit 604 can search the potential search area for the feature area to obtain the position information.

In an embodiment, if the re-projection error is greater than the preset threshold, the search unit 604 can also redetermine, based on the current image, the position of the feature area in the current image.

In an embodiment, if the re-projection error is greater than the preset threshold, the acquisition unit 602 can also acquire a new image captured by the camera. The search unit 604 can search the new image for the feature area, based on the feature area information, to determine new position information of the feature area in the new image. The first determination unit 606 can determine new first pose information associated with the position and attitude of the feature area relative to the camera, based on the new position information. The calculation unit 608 can calculate the new re-projection error of the feature area in the new image, based on the new first pose information.

If the new re-projection error is less than or equal to the preset threshold, the second determination unit 610 can determine new pose information associated with the position and attitude of the interactive device in the global coordinate system, based on the new first pose information.

If the new re-projection error is greater than the preset threshold, the search unit 604 can redetermine, based on the new image, the position of the feature area in the new image, or the acquisition unit 602 can acquire another new image captured by the camera so that the search unit 604 re-searches the another new image for the feature area.

In an embodiment, the electronic device 600 can be an interactive device having computing functions, or the electronic device 600 can be a device different from the interactive device.

The units of the electronic device 600 can perform the corresponding processes in the method embodiments of FIGS. 1 to 4. Therefore, for brevity of description, specific operations and functions of the units of the electronic device 600 are not described here.

Figure 7:
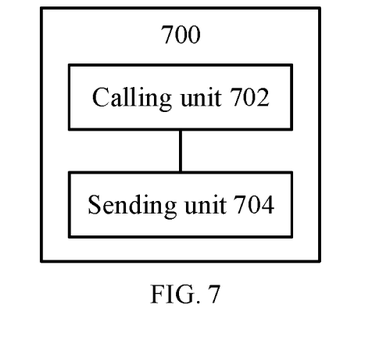
FIG. 7 is a schematic block diagram of an apparatus for spatial locating according to an embodiment.

FIG. 7 is a schematic block diagram of an apparatus for spatial locating according to an embodiment.

As shown in FIG. 7, the apparatus 700 can include a calling unit 702 and a sending unit 704.

The calling unit 702 can call a camera to perform photography to obtain a current image, which includes a feature area of an interactive device.

The transmitter unit 704 can send the current image to an electronic device so that the electronic device determines current pose information associated with the position and attitude of the interactive device currently in a global coordinate system, based on the current image. For example, the electronic device can be the electronic device 600 of FIG. 6.

The above-mentioned electronic device 600 and apparatus 700 can be implemented in hardware, or in software, or can be implemented by a combination of software and hardware.

Figure 8:
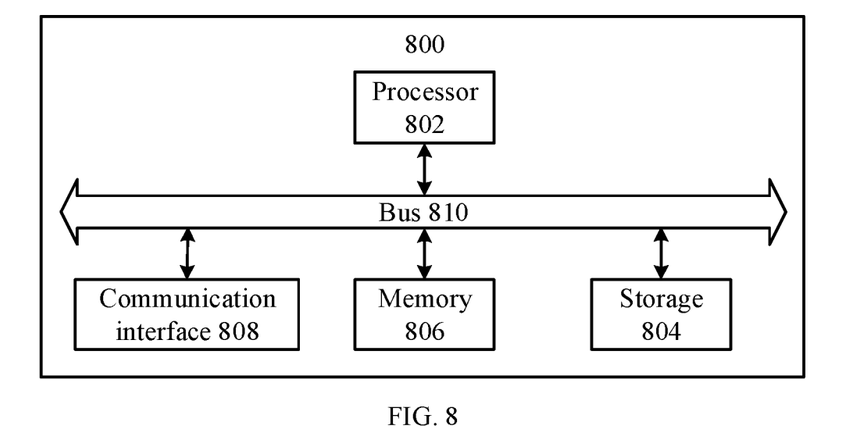
FIG. 8 is a hardware schematic diagram of an electronic device according to an embodiment.

FIG. 8 is a hardware structural diagram of an electronic device according to an embodiment. As shown in FIG. 8, the electronic device 800 can include at least one processor 802, a storage 804, a memory 806, and a communication interface 808, and the at least one processor 802, the storage 804, the memory 806 and the communication interface 808 can be connected together via a bus 810. The at least one processor 802 executes at least one executable code (i.e., an element implemented in software form as described above) stored or encoded in the storage 804.

In an embodiment, the executable code stored in the storage 804, when executed by the at least one processor 802, causes the electronic device 800 to implement the various processes described above in conjunction with FIGS. 1 to 4.

The electronic device 800 can be implemented in any applicable form in the art, for example including but not limited to a smart phone, a tablet device, a smart wearable device, other electronic device with computing functions, etc.

Figure 9:
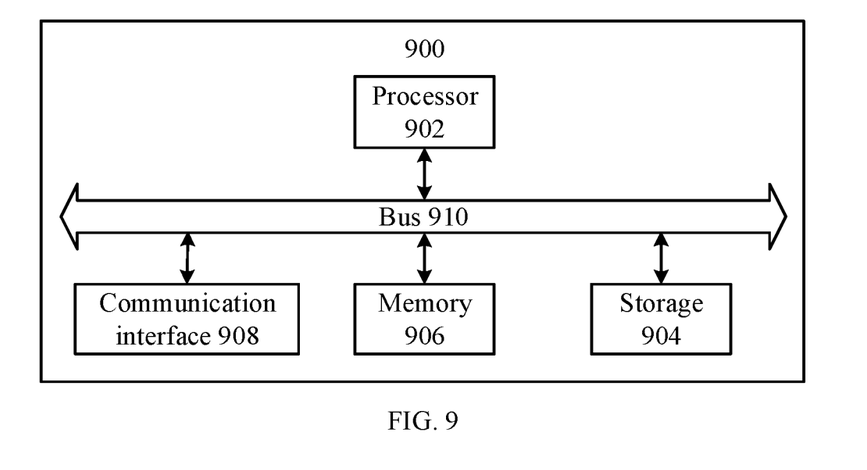
FIG. 9 is a hardware schematic diagram of an apparatus for spatial locating according to an embodiment.

FIG. 9 is a hardware structural diagram of an apparatus for spatial locating according to an embodiment. As shown in FIG. 9, the apparatus 900 can include at least one processor 902, a storage 904, a memory 906, and communication interface 908, and the at least one processor 902, the storage 904, the memory 906 and the communication interface 908 can be connected together via a bus 910. The at least one processor 902 executes at least one executable code (i.e., an element implemented in software form as described above) stored or encoded in the storage 904.

In an embodiment, the executable code stored in the storage 904, when executed by the at least one processor 902, causes the apparatus 900 to implement the process described above in conjunction with FIG. 5.

In an embodiment, the apparatus 900 can be an AR device, which can be implemented in any applicable form in the art, for example implemented as a head-mounted device.

An embodiment of the description also provides a machine-readable storage medium. The machine-readable storage medium can store executable codes that, when executed by a machine, causes the machine to implement the specific processes of the method embodiments described above with reference to FIGS. 1 to 4.

An embodiment of the description also provides a machine-readable storage medium. The machine-readable storage medium can store executable codes that, when executed by a machine, causes the machine to implement the specific process of the method embodiment described above with reference to FIG. 5.

For example, the machine-readable storage medium can include, but is not limited to, a random access memory (RAM), a read-only memory (ROM), an electrically-erasable programmable read-only memory (EEPROM), a static random access memory (SRAM), a hard disk, a flash memory, etc.

It should be understood that the embodiments in the description are described in a progressive manner. For the same and similar parts between the embodiments, reference can be made to each other. Each embodiment focuses on differences from other embodiments. For example, the apparatus embodiment, the computer device embodiment and the machine-readable storage medium embodiment are described relatively simply as they are substantially similar to the method embodiments, and for relevant parts, reference can be made to parts of description of the method embodiments.

Particular embodiments of the description are described above. Other embodiments are within the scope of the appended claims. In some cases, actions or steps recited in the claims can be performed in a sequence different from that in the embodiments, and still can achieve an expected result. Furthermore, the processes depicted in the accompanying drawings do not necessarily require the shown particular sequence or successive sequence so as to achieve an expected result. In some implementations, multitasking and parallel processing are also possible or may be advantageous.

Not all of the steps and units in the above processes and system structural diagrams are necessary, and some steps or units can be omitted depending on actual needs. The apparatus structures described in the above embodiments can be physical structures, and can also be logical structures, i.e., some units may be implemented by the same physical entity, or some units may be implemented respectively by a plurality of physical entities, or can be implemented jointly by some components of a plurality of independent devices.

The term "exemplary" used throughout the description means "used as an example, instance or illustration" and does not mean "preferred" or "advantageous" over other embodiments. For the purpose of providing understanding of the described technology, specific implementations include specific details. However, the technology can be implemented without the specific details. In some examples, to avoid making the concepts in the described embodiments difficult to understand, commonly known structures and apparatuses are shown in the form of block diagrams.

Optional implementations of embodiments of the present disclosure are described above in detail in conjunction with the accompanying drawings. However, the embodiments of the present disclosure are not limited to the specific details in the above implementations. Within the scope of the technical conception of the embodiments of the present disclosure, various variations can be made to the technical solutions of the embodiments of the present disclosure, and these variations are all encompassed within the protection scope of the embodiments of the present disclosure.

The foregoing description of the present disclosure is provided to enable any person of ordinary skill in the art to implement or use the present disclosure. Various modifications to the present disclosure are obvious to those of ordinary skill in the art, and the general principles defined herein can also be applied to other variations without departing from the scope of protection of the present disclosure. Thus, the present disclosure is not limited to the examples and designs described herein, but is consistent with the broadest scope conforming to the principles and novelty features of the present disclosure.

The invention claimed is:

1. A method for spatial locating, comprising:
acquiring feature area information and a current image captured by a camera;
searching the current image for a feature area of an interactive device based on the feature area information, to determine position information, the position information being configured to indicate a position of the feature area in the current image;
determining first pose information associated with a position and attitude of the feature area relative to the camera based on the position information;
calculating a re-projection error of the feature area in the current image based on the feature area information and the first pose information; and
if the re-projection error is less than or equal to a preset threshold, based on the first pose information, determining current pose information associated with a position and attitude of the interactive device currently in a global coordinate system.

2. The method according to claim 1, wherein the feature area is two-dimensional or is located on a plane.

3. The method according to claim 1, wherein the feature area comprises: a target picture located on the interactive device; or a physical structure on the interactive device where feature point detection is performed.

4. The method according to claim 3, wherein the interactive device comprises a display screen; and the method further comprises: displaying the target picture on the display screen.

5. The method according to claim 4, further comprising:
acquiring, by means of/by using the camera, environment image information related to an environment surrounding the interactive device;

determining a first color based on the environment image information, wherein the first color accounts for a lowest proportion in the environment image information; and generating the target picture based on the first color.

6. The method according to claim 5, wherein generating the target picture comprises:
determining a second color inverse to the first color by color inversion; and
generating the target picture comprising the first color and the second color, wherein in the target picture, a color of an edge portion of the target picture is the first color and a color of a center portion of the target picture is the second color.

7. The method according to claim 5, wherein generating the target picture comprises:
determining a user preset picture; and
obtaining the target picture by adding a border having the first color to the user preset picture.

8. The method according to claim 5, wherein generating the target picture comprises:
generating a border graphic having the first color, the border graphic being the target picture; and
displaying the target picture on the display screen comprises:
displaying the border graphic at a border of the display screen.

9. The method according to claim 4, wherein the method comprises:
in responds to detecting that the current image comprises at least two identical feature areas, changing the target picture displayed on the display screen.

10. The method according to claim 1, wherein determining the current pose information comprises:
acquiring second pose information associated with a position and attitude of the camera in the global coordinate system; and
determining the current pose information, based on the first pose information and the second pose information.

11. The method according to claim 1, wherein determining the current pose information comprises:
acquiring second pose information associated with a position and attitude of the camera in the global coordinate system and acquiring, by means of an inertial measurement unit, IMU data, the IMU data being currently related to an angular velocity about three axes and an acceleration along three axes of the interactive device, wherein the inertial measurement unit is arranged in the interactive device; and
determining the current pose information based on the first pose information, the second pose information, and the IMU data.

12. The method according to claim 1, wherein searching the current image for the feature area based on the feature area information, to determine position information comprises:
estimating an estimated position of the feature area in the current image based on previous IMU data, the IMU data being acquired by means of an inertial measurement unit and related to an angular velocity about three axes and an acceleration along three axes of the interactive device, wherein the inertial measurement unit is arranged in the interactive device;
determining a potential search area in the current image based on the estimated position; and
searching the potential search area for the feature area to obtain the position information.

13. The method according to claim 1, further comprising:
if the re-projection error is greater than the preset threshold, redetermining the position of the feature area in the current image based on the current image; or
if the re-projection error is greater than the preset threshold, performing the following actions:
acquiring a new image captured by the camera;
searching the new image for the feature area based on the feature area information, to determine new position information of the feature area in the new image;
determining new first pose information associated with the position and attitude of the feature area relative to the camera based on the new position information;
calculating a new re-projection error of the feature area in the new image based on the new first pose information; and
if the new re-projection error is less than or equal to the preset threshold, determining new pose information associated with the position and attitude of the interactive device in the global coordinate system based on the new first pose information;
if the new re-projection error is greater than the preset threshold, redetermining the position of the feature area in the new image based on the new image, or acquiring another new image acquired by the camera to re-search the another new image for the feature area.

14. A method for spatial locating, comprising:
acquiring feature area information and a current image captured by a camera of a head-mounted device;
searching the current image for a feature area, the feature area being a target picture displayed by a display screen of an interactive device based on the feature area information, to determine position information, the position information being configured to indicate a position of the feature area in the current image, the interactive device being electrically connected to the head-mounted device and configured to transmit a rendering result to the head-mounted device;
determining first pose information associated with a position and attitude of the feature area relative to the camera based on the position information;
calculating a re-projection error of the feature area in the current image based on the feature area information and the first pose information; and
if the re-projection error is less than or equal to a preset threshold, based on the first pose information, determining current pose information associated with a position and attitude of the interactive device currently in a global coordinate system.

15. The method according to claim 14, comprising:
acquiring second pose information associated with a position and attitude of the camera in the global coordinate system and acquiring, by means of an inertial measurement unit, IMU data, the IMU data being currently related to an angular velocity about three axes and an acceleration along three axes of the interactive device, wherein the inertial measurement unit is arranged in the interactive device; and
determining the current pose information based on the first pose information, the second pose information, and the IMU data.

16. The method according to claim 14, wherein an edge portion of the target picture has a color different from a color of the surface on which the display screen is provided, the color of the edge portion of the target picture can be determined by color inversion, by subtracting, from a value 255, a RBG value of the color of the surface on which the display screen is provided.

17. The method according to claim 14, wherein the target picture comprises a border and a user preset picture arranged in the border.

18. An interactive device, comprising:
  at least one processor;
  a display screen configured to display a target picture as a feature area; and
  a storage communicating with the at least one processor, storing thereon executable codes which, when executed by the at least one processor, cause the at least one processor to implement a method for spatial locating, comprising:
  acquiring feature area information and a current image captured by a camera;
  searching the current image for a feature area of an interactive device based on the feature area information, to determine position information, the position information being configured to indicate a position of the feature area in the current image;
  determining first pose information associated with a position and attitude of the feature area relative to the camera based on the position information;
  calculating a re-projection error of the feature area in the current image based on the feature area information and the first pose information; and
  if the re-projection error is less than or equal to a preset threshold, based on the first pose information, determining current pose information associated with a position and attitude of the interactive device currently in a global coordinate system.

19. The interactive device according to claim 18, wherein the camera is provided in an electronic device different from the interactive device, the interactive device is communicatively connected to the electronic device to receive the current image to the interactive device.

20. The interactive device according to claim 18, wherein the interactive device is provided with an inertial measurement unit, wherein determining the current pose information comprises:
  acquiring second pose information associated with a position and attitude of the camera in the global coordinate system and acquiring, by means of the inertial measurement unit, IMU data, the IMU data being currently related to an angular velocity about three axes and an acceleration along three axes of the interactive device; and
  determining the current pose information based on the first pose information, the second pose information, and the IMU data.

* * * * *